INVENTOR.
HENRI A. DELCELLIER

INVENTOR.
HENRI A. DELCELLIER

INVENTOR.
HENRI A. DELCELLIER

INVENTOR.
HENRI A. DELCELLIER

United States Patent Office 3,392,114
Patented July 9, 1968

3,392,114

APPARATUS AND METHOD FOR DECONTAMINATING PULP AND PAPER MACHINE EFFLUENT

Henri A. Delcellier, Beaurepaire, Quebec, Canada, assignor to Canadian Ingersoll-Rand Company Limited, Montreal, Canada, a corporation of Canada Filed May 26, 1965, Ser. No. 459,007
8 Claims. (Cl. 210—60)

ABSTRACT OF THE DISCLOSURE

An apparatus for removing contaminating solids from effluent discharged by paper producing machines, comprising a centrifugal drainer, a cyclonic separator and a settling tank, connected to serially receive the effluent. In addition, a method for removing contaminating solids from the effluent through the employment of this apparatus.

This invention relates to pulp and paper making machinery and more particularly to the provision of a new and improved apparatus and method for the removal and disposal of the contaminating solids in the effluent discharged by paper producing machines such as pulp and paper making machinery.

The operation of pulp and paper mills is heavily dependent upon the employment of vast quantities of water. Conventionally, this water has been drawn from nearby lakes and rivers and has been returned to its source contaminated by deleterious solids such as dirt, fiber, chemicals, and bark which have accumulated during the pulp and/or paper making process. In this manner the operation of pulp and paper mills has contaminated the sources of this water.

Due to the increasing proximity of human habitation and legal actions undertaken by local authorities, the pulp and paper industry is being required to clean up this effluent water prior to returning it to its source. However, at the present time no satisfactory machinery, except expensive conventional sewage treatment plants, is known for removing substantially all of these deleterious solids from the mill effluent.

For instance, lagoons (i.e., sedimentation holes in the ground) which have been utilized for this purpose have been found to be undesirable in that they are usually odorous and are expensive in land area. Linear screens on inclined drums, inclined screens, and inclined screen drums which have also been tried for this purpose have been rejected as they do not achieve a sufficient degree of dewatering of the deleterious mill effluent. And the centrifugal filter apparatus disclosed in my pending application Ser. No. 353,775, filed Mar. 23, 1964, while removing a large portion of the deleterious solids, does not by itself remove all thereof.

An object of the present invention is to provide a new and improved apparatus for removing and disposing of substantially all of the contaminating solids in the effluent water of paper producing machines such as pulp and paper making machinery.

Another object of the invention is to provide a new and improved apparatus of the type set forth which recovers such a large proportion of the contaminating solids that, when the effluent water is returned to its source, no substantial contamination of the water source results.

Another object is to provide a new and improved apparatus of the type set forth which recovers such a large proportion of the contaminating solids that the effluent water may be reclaimed for reuse in the pulp and paper making machinery, thereby achieving economy of water supply and conservation of heat.

Another object is to provide a new and improved apparatus of the type set forth which is relatively simple and economical in construction and in operation.

Another object is to provide a new and improved method for removing and disposing of substantially all of the contaminating solids in the effluent water of pulp and paper making machinery which employs this apparatus in its practice.

Other objects and advantages of the invention will be apparent from the following description taken in connection with the accompanying drawings. It will be understood that changes may be made in the details of construction and arrangement of parts shown and described as the preferred embodiments of the invention have been given by way of illustration only.

Referring to the drawings.

Figure 1:
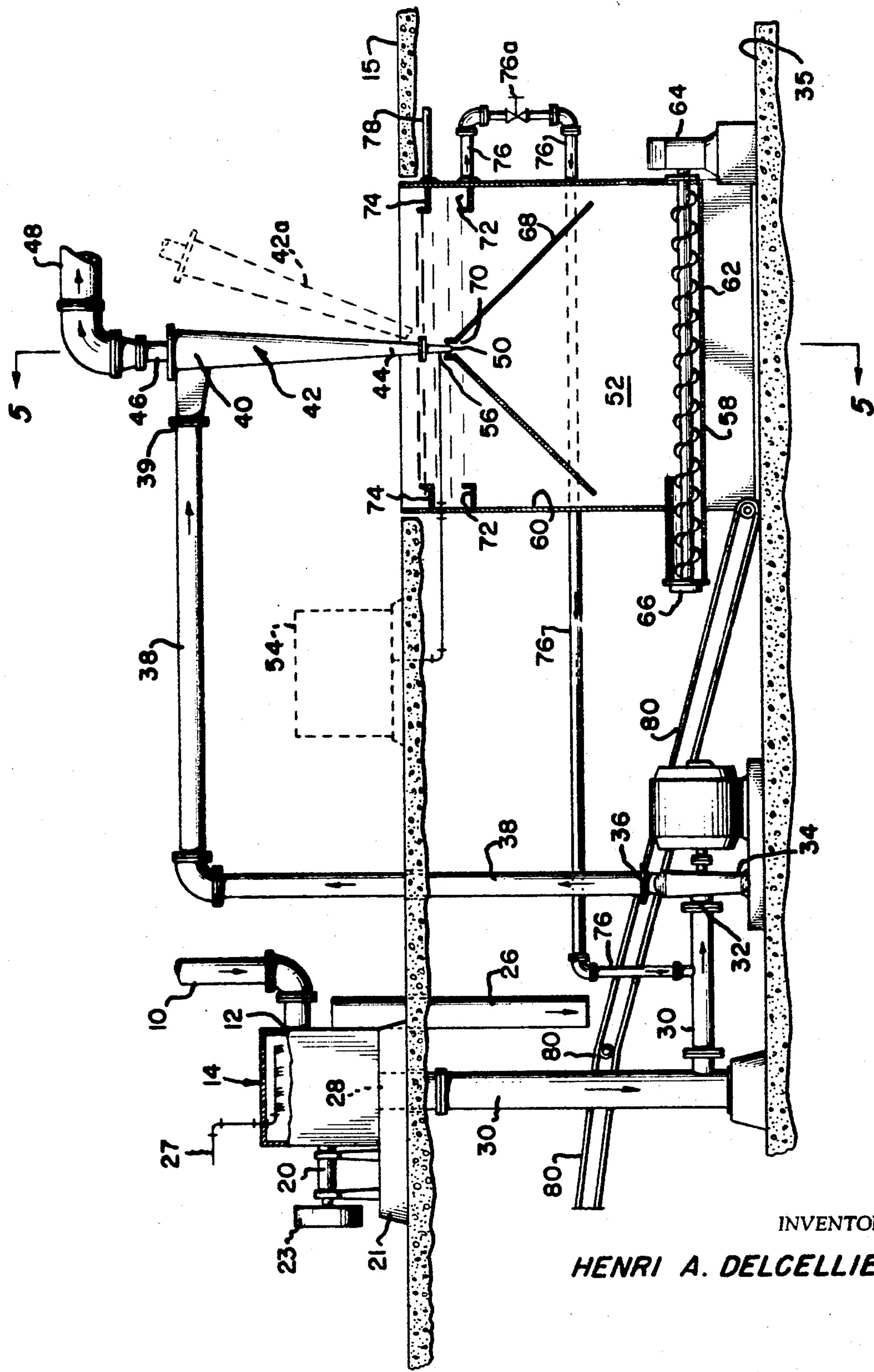
FIG. 1 is a schematic view of one embodiment of the apparatus and method provided by the present invention.

Referring more particularly to the drawings wherein similar reference characters designate corresponding parts throughout the several views, FIG. 1 illustrates schematically an apparatus for recovering the contaminating solids from the effluent water of a pulp or paper making machine, such as a barking drum (not shown), which discharges effluent water at the rate of approximately 1500 gallons per minute. It will be understood, however, that the apparatus illustrated in FIG. 1, while being particularly adapted for application with machinery discharging effluent water at a flow rate of 1500 gallons per minute, is readily and simply adaptable for employment with machinery having other rates of discharge.

Figure 2:
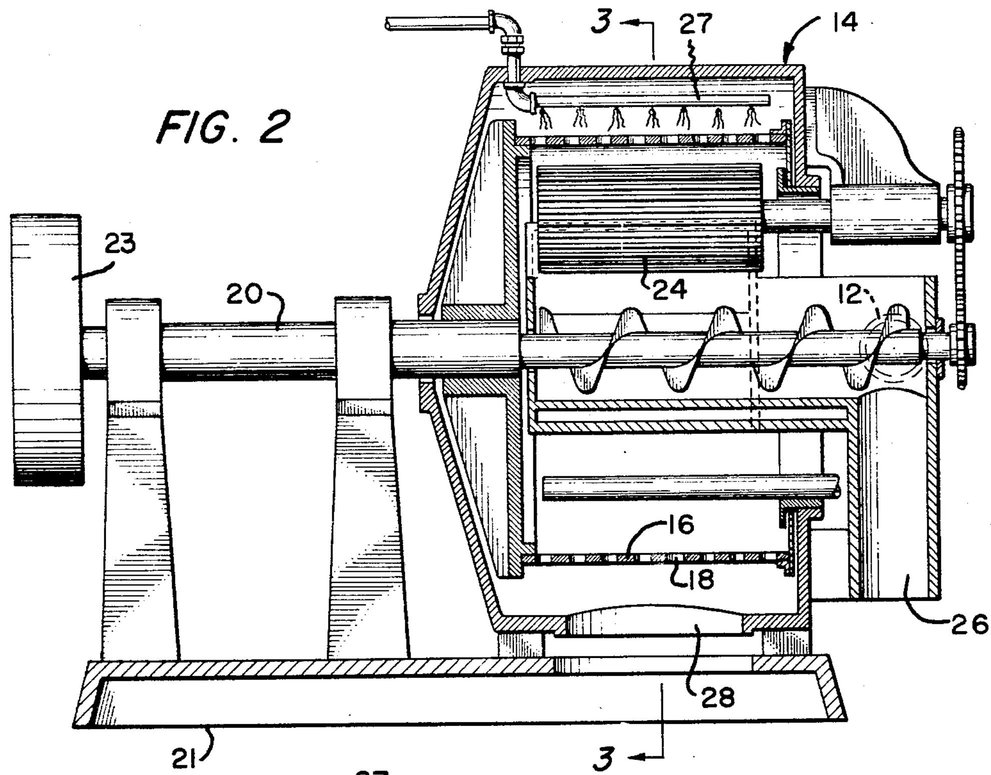
FIG. 2 is an enlarged, sectional elevational view of the centrifugal drainer illustrated in FIG. 1.
Figure 3:
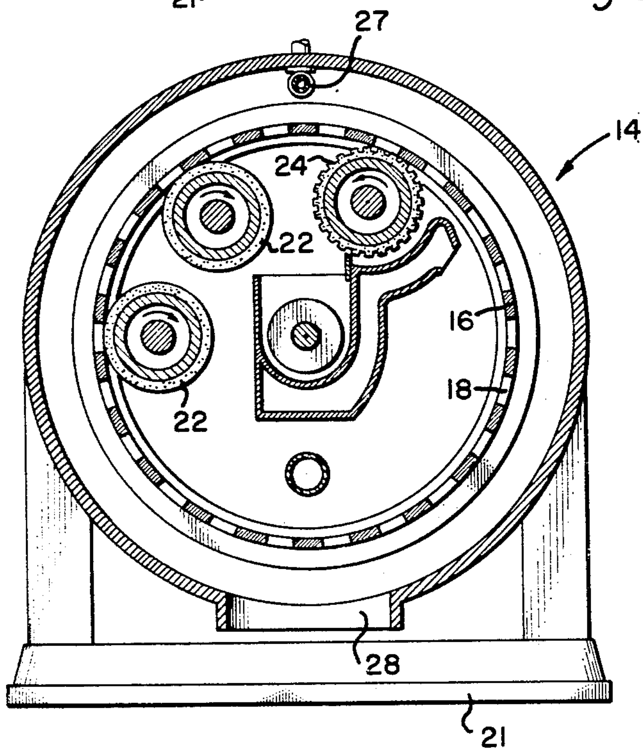
FIG. 3 is a sectional view of the centrifugal drainer taken on line 3—3 of FIG. 2 looking in the direction of the arrows.

More specifically, as will be seen from FIG. 1, the effluent water and contaminating solids discharged by the barking drum or other pulp or paper making machinery are directed by a fluid conduit means 10 into the fluid inlet 12 of a centrifugal drainer or screening apparatus 14 which is supported by a first floor means 15. The centrifugal drainer 14, as will be seen from FIGS. 2 and 3, is illustrated as being of the type disclosed in United States Patent No. 3,114,309, entitled Centrifugal Thickener for Paper Pulp which was issued December 17, 1963, to Anton J. Haug and is assigned to the assignee of the present patent application.

The centrifugal drainer 14 comprises, in brief, a screen drum 16 which includes therein a plurality of drainage openings 18 and is fixedly carried by a rotatable shaft 20. The shaft 20 is rotatably supported on a base 21 and, as illustrated, is driven by a pulley 23. The fluid inlet 12 is constructed and arranged to direct effluent water against one side of the screen drum 16; and a plurality of press rolls 22 are resiliently mounted against the screen drum 16 diametrically opposite to the fluid inlet 12. A single roll 24 is disposed intermediate the press rolls 22 and the fluid inlet 12 for rotation in a direction opposite to that of the screen drum 16 and is adapted to remove deleterious solids of too large a diameter to pass through the openings 18 from the screen drum 16. The portion of the rotatable shaft 20 which is adjacent the roll 24 is formed in the configuration of a feed screew and is adapted to direct the larger deleterious solids from the centrifugal drainer 14 by the outlet chute 26. In order to facilitate the operation of the centrifugal drainer 14, steam may be introduced from a source (not shown) through pipe means 27 to keep the screen drum 16 free from resin.

In the operation of the centrifugal drainer 14, the effluent water and contaminating solids passing through the fluid conduit 10 enter through the fluid inlet 12 and are directed against the rotating screen drum 16. Due to the action of centrifugal separation, a large portion of this effluent water and the smaller contaminating solids pass through the openings 18 and escape from the centrifugal drainer 14 by the fluid outlet 28. A further portion of the effluent water and its attendant contaminating solids is squeezed from the material adhering on the screen drum 16 by the press rolls 22 and also escape by means of the openings 18 and the fluid outlet 28. That portion of the contaminating solids which is of too large size to pass through the openings 18 is removed from the screen drum 16 by the roll 24 and is directed by the feed screw on the shaft 20 through the outlet chute 26 to be disposed of in a manner to be hereinafter described. In this manner, contaminating solids of larger diameter than, for example, .006 inch may be removed from the effluent water.

A fluid passage means 30 is connected to the fluid outlet 28 of the centrifugal drainer 14 and communicates such with the inlet 32 of a fluid pump 34 which is supported by a second floor means 35. Thus, the effluent water and smaller contaminating solids which pass through the fluid outlet 28 enter the fluid passage means 30 and are directed thereby to the inlet 32 of the fluid pump 34.

The outlet 36 of the fluid pump 34, as illustrated, is connected by a fluid passage means 38 to an inlet port 39 in the large diameter end 40 of a single cyclone or cyclonic separator 42 of small cone angle. It will be understood, however, as shown by the cyclone 42*a* in broken lines in FIG. 1, that a plurality of cyclones 42 could be connected in parallel to the fluid passage means 38. The fluid pump 34 is constructed and arranged to supply the effluent water and its carried contaminating solids through the fluid passage means 38 and tangentially into the large diameter end 40 of the cycolne 42 at a suitable pressure such as, for example, sixty to eighty pounds per square inch.

The effluent water and its attendant contaminating solids are, thus, tangentially introduced into the large diameter end 40 of the cyclone 42 and rotated at increasing high speed towards the small diameter end 44 thereof. As will be apparent to those skilled in the art, this high speed rotation of the effluent water causes the centrifugal separation of a portion thereof from the remainder which carries the contaminating solids. The portion of the effluent water which is, thus, freed from solid contaminants rises within the cyclone 42 and escapes through a port means 46 in the large diameter end 40 thereof. In the foregoing example wherein the fluid pump 34 delivers the effluent water to the cyclone 42 at a pressure of between sixty to eighty pounds per square inch, this escaping uncontaminated effluent water will escape from the illustrated cyclone 42 at a pressure of between thirty and thirty-five pounds per square inch.

A fluid passage means 48 is connected to the port means 46 and extends within the cyclone 42 below the inlet port 38 therein. The fluid passage means 48 communicates with the barking showers (not shown) or other pulp or paper making machine to return the clarified effluent water for reuse. Alternatively, however, should economy of water and conservation of heat be of only relatively minor importance in the application of the apparatus, this water may be safely returned to its source without danger of substantial contamination or pollution thereof. The remainder of the effluent water which carries the contaminating solids is discharged through a port means 50 in the small diameter end 44 of the cyclone 42 into a settling chamber 52.

Although the successful operation of a settling chamber is, of course, dependent upon the relative dimensions of the chamber as well as the rate of flow thereinto, it has been found that it is usually preferable to form the port means 50 in the cyclone 42 to allow a flow of effluent water into the settling chamber 52 at a rate of approximately one foot per minute. Furthermore, in order to facilitate flocculation and settling of the solid contaminants in the settling chamber 52, a conventional sewage treatment chemical such as alum may be introduced into the effluent water which carries the contaminating solids immediately prior to its passage through the port means 50 in the cyclone 42. More specifically, as shown by broken lines in FIG. 1, a source of suitable chemical 54 may be connected to the small diameter end 44 of the cyclone 42 by a fluid passage means 56 such as to introduce a controlled amount of chemical to the effluent water immediately prior to its passage into the settling chamber 52.

Figures 4, 5:
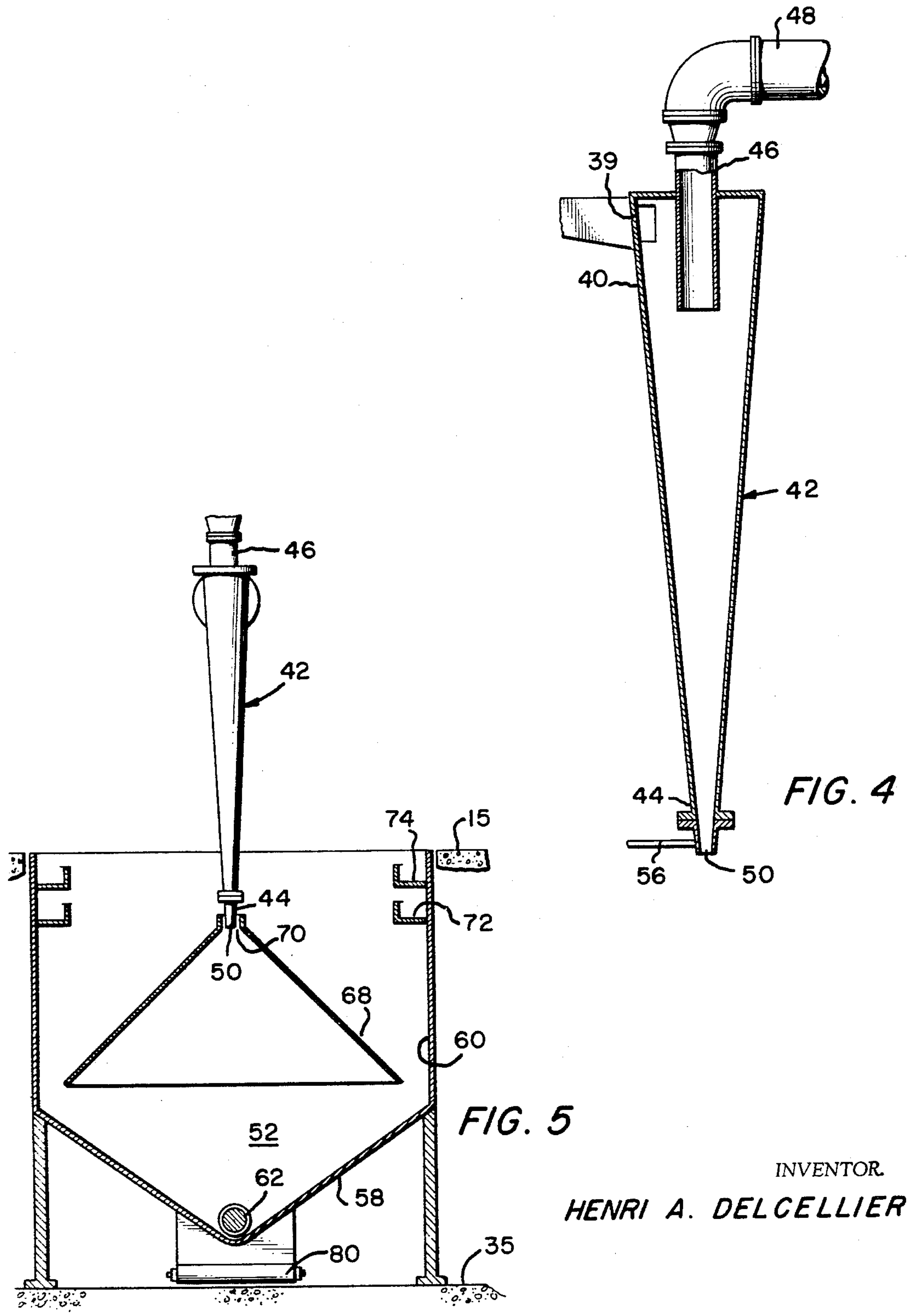
FIG. 4 is an enlarged, sectional elevational view of the cyclone illustrated in FIG. 1.
FIG. 5 is an enlarged sectional view of the settling chamber, with the cyclone in elevation, taken on line 5—5 of FIG. 1 looking in the direction of the arrows.

The setting chamber 52, as will be seen from FIGS. 1 and 5, is formed to include a base 58 which is of inverted pyramidal configuration and a plurality of side walls 60 which extend vertically from the base 58. The nadir of the base 58 carries a screw type conveyor mechanism 62 which is driven by a drive or motor designated generally at 64 towards a normally closed outlet door 66 in one of the side walls 60 of the settling chamber 52.

A deflector 68 of conical configuration is disposed within the settling chamber 52 in vertically spaced relationship with the base 58 and horizontally spaced relationship with the side walls 60. The deflector 68 includes an opening 70 at its apex which is adapted to receive the small diameter end 44 of the cyclone 42. The deflector 68 serves to control the solid contaminants in the effluent water in the settling chamber 52 to restrain such from rising towards the top of the settling chamber 52.

A plurality of vertically spaced collecting troughs 72 and 74 are carried by the side walls 60 of the settling chamber 52 and extend continuously therearound. As will be seen from FIG. 1, the collecting trough 72 is connected to a fluid passage means 76 which communicates with the fluid passage means 30 immediately prior to its connection to the inlet 32 of the fluid pump 34. Thus, as illustrated, effluent water passing through the fluid passage means 76 is returned to the fluid pump 34 and the cyclone 42. Alternatively, however, this water may be returned to its source without substantial pollution or contamination thereof. The collecting trough 74 is connected to a fluid passage means 78 which communicates with sewage disposal means (not shown).

In the operation of the settling chamber 52, effluent water is introduced therein at a controlled rate of flow by the port means 50 in the cyclone 42 and is directed towards the base 58 of the settling chamber 52. The contaminating solids carried by the effluent water in the settling chamber 52, due to their relatively high density, substantially all separate from the effluent water and drop onto the base 58. As the base 58 is of inverted pyramidal configuration, it directs these separated contaminating solids towards its nadir wherein is located the conveyor apparatus 62.

Thus, substantially all of the contaminating solids in the effluent water are separated therefrom and deposited upon the conveyor apparatus 62. Periodic operation of the conveyor apparatus 62 removes the solids thereon from the settling chamber 52 through the outlet door 66 and deposits such upon a second conveyor apparatus 80 which is in cooperating relationship with the conveyor apparatus 62. The second conveyor apparatus 80, as will be seen from FIG. 1, extends vertically below the outlet chute 26 of the continuous drainer 14 to receive the solids separated therein and carries the solids separated by the continuous drainer 14 and the settling chamber 52 to a bark press (not shown) and a burner (not shown) where they are incinerated.

The clarified effluent water in the settling chamber 52 flows upwardly therein between the side walls 60 and the deflector 68 until it reaches the level of the collecting trough 72. Overflow then occurs into the collecting trough 72 under the control of a valve **76*a* which is interposed in the fluid passage means 76. The valve 76*a* is set such that the level of the clarified effluent water reaches the level of the collecting trough 74; and there is a minor overflow into the collecting trough 74. This latter overflow ensures that any scum or contaminating solids of lighter density than the clarified water in the settling chamber 52 will be removed therefrom and transported to sewage disposal means (not shown) by the fluid passage means 78. Thus, the contaminating solids are removed from both the upper and lower surfaces of the clarified effluent water in the settling chamber 52, while the clarified effluent water is removed from the settling chamber 52 by the fluid passage means 76 and returned to the cyclone 42**.

In this manner, the apparatus illustrated in FIGS. 1 through 5 is capable of recovering over ninety-five percent of the contaminating solids in effluent water flowing at the rate of 1500 gallons per minute, while requiring only ten gallons per minute of run-off to sewage disposal means.

The operation of the apparatus illustrated in FIGS. 1 through 5 and the practice of the method of the invention thereby are believed to be apparent from the foregoing description taken in connection with the flow arrows shown in FIG. 1.

Figure 6:
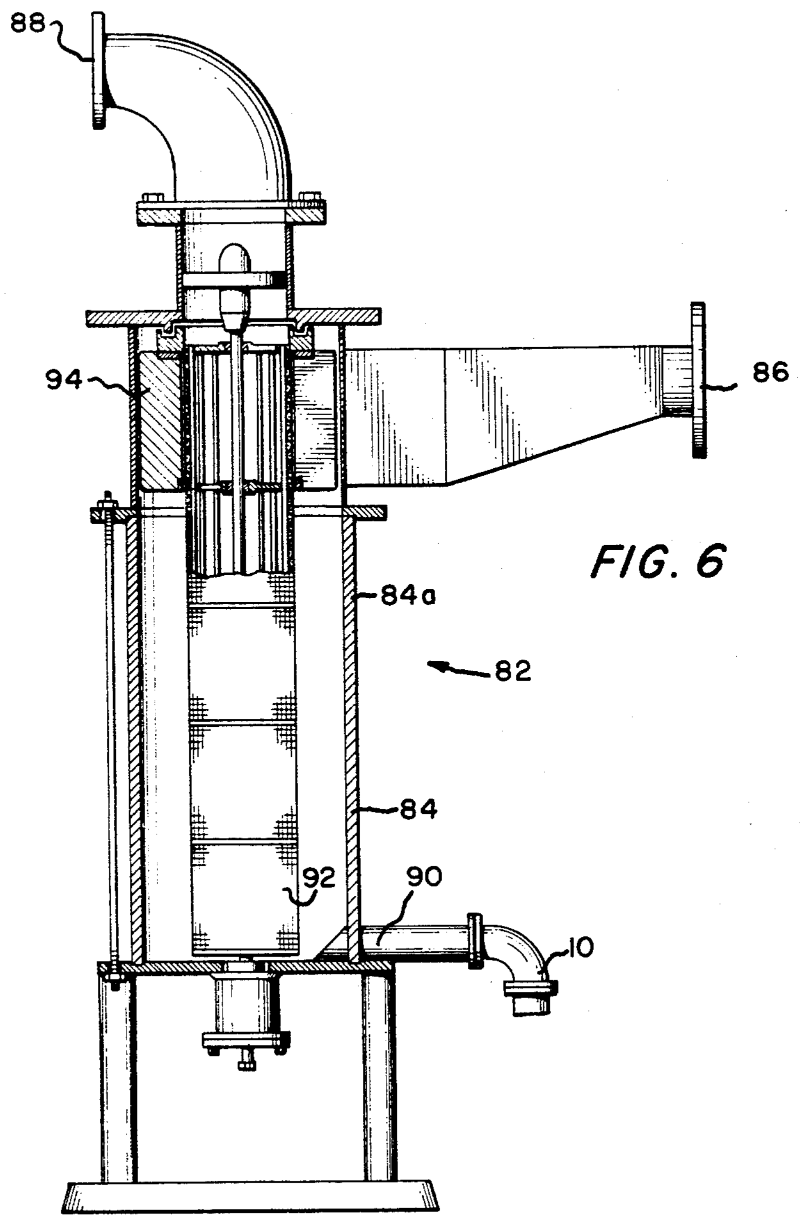
FIG. 6 is a fragmentary, sectional view of an alternative embodiment of the apparatus and method provided by the present invention.

FIG. 6 illustrates a fragmentary, sectional view of an alternative embodiment of the invention which is particularly adapted for recovering the contaminating solids from effluent water discharged at a rate far in excess of 1500 gallons per minute. More specifically, as illustrated, this embodiment of the invention is particularly adapted to decontaminate effluent water being discharged at the rate of approximately 6,000 gallons per minute. It will be understood, however, that the application of this embodiment of the invention is not limited to flows of 6,000 gallons per minute as the illustrated apparatus is readily adaptable for other rates of flow.

In this embodiment of the invention a centrifugal filter apparatus of the type disclosed in my copending application, Serial No. 353,775, which was filed March 23, 1964, and is entitled Centrifugal Filter Apparatus is interposed intermediate the pulp or paper making machine (not shown) and the centrifugal drainer 14. The centrifugal filter apparatus which is designated generally at 82, as employed in FIG. 6, is adapted to provide a preliminary filtering or clarifying of the effluent water to reduce the volume thereof passing into the centrifugal drainer 14 to approximately 1500 gallons per minute.

More specifically, as will be seen from FIG. 6, the centrifugal filter apparatus 82 comprises a housing 84 which is formed to include a body portion **84*a* and a fluid inlet 86. The fluid inlet 86 is adapted to be connected to a pulp or paper making machine (not shown) to receive the effluent water therefrom and directs such tangentially into the body portion 84*a* of the housing 84** in a high velocity cyclonic flow.

The body portion **84*a* of the housing 84 includes a first fluid outlet 88 adjacent its upper end and a second fluid outlet 90 adjacent its lower end. A rotatable screen 92 having a vertical axis is disposed within the body portion 84*a* and carries a plurality of paddle members 94 adjacent the juncture of the body portion 84*a* and the fluid inlet 86**.

In the operation of this embodiment of the invention, effluent water entering the fluid inlet 86 at a volume of approximately 6,000 gallons a minute is directed tangentially into the body portion **84*a* of the housing 84 wherein it acts on the paddle members 94 to effect rotation of the screen 92. The heavier contaminating solids carried by this incoming water are carried downwardly by their weight and, together with approximately 1500 gallons per minute of effluent water, pass through the second fluid outlet 90 to the apparatus illustrated in FIG. 1 for further treatment. The lighter contaminating fluids flow into the screen 92 and are caught therein. The remainder of the effluent water, having been thus clarified of both its heavier and lighter solid contaminants, rises in the body portion 84*a* and is discharged therefrom through the first fluid outlet 88**. This discharged effluent water, as it has been clarified of its solid contaminants, would normally be returned to the barking showers (not shown) or other pulp or paper making machinery for reuse. Alternatively, however, it may be returned to its source without danger of substantial contamination or pollution thereof.

The operation of the alternative embodiment of the invention illustrated in FIG. 6 and the practice thereby of the method provided by the present invention are believed to be apparent from the foregoing description.

From the foregoing it will be seen that I have provided a new and improved, simple and economical apparatus and method for recovering substantially all of the contaminating solids from the effluent water discharged by a pulp or paper making machine such that the effluent water may either be reused or returned to its source without danger of substantial contamination or pollution thereof.

From the foregoing it will be seen that I have provided new and improved means for accomplishing all of the objects and advantages of my invention.

Having thus described my invention, I claim:

1. An apparatus for removing contaminating solids from effluent discharged by paper producing machines, comprising:

first conduit means adapted to be connected to a paper producing machine for carrying effluent therefrom;

screening means for dividing the larger solid contaminants in the effluent from the remainder of the effluent, said screening means being connected to said first conduit means to receive effluent from the latter;

second conduit means connected to said screening means for carrying said remainder of the effluent from said screening means;

cyclonic separating means for separating said remainder into a first portion substantially freed from contaminating solids and a second portion carrying contaminating solids, said cyclonic separating means being connected to said second conduit means to receive said remainder from the latter;

third conduit means connected to said cyclonic separating means for discharging from the apparatus said first portion of said remainder;

a settling tank arranged to receive said second portion from said cyclonic separating means for containing said second portion to allow the lighter contaminating solids therein to collect adjacent the upper level of said second portion while the heavier contaminating solids therein collect adjacent the lower level of said second portion;

first discharge means for discharging said lighter contaminating solids from adjacent the upper end of said settling tank;

second discharge means for discharging said heavier contaminating solids from adjacent the lower end of said settling tank; and an outlet conduit communicating with said settling tank intermediate the upper and lower ends thereof for discharging clarified effluent from said settling tank;

said outlet conduit being connected to supply said clarified effluent to said cyclonic separating means such that the clarified effluent flows into said cyclonic separating means and is discharged from the apparatus through said third conduit means.

2. An apparatus according to claim 1, further comprising:

deflector means disposed within said settling tank intermediate the upper and lower ends thereof for controlling the upward flow of contaminating solids in said second portion.

3. An apparatus according to claim 2, further comprising:

said deflector means including an apex and sides declining from said apex, the base of said tank including a nadir and sides inclining from said nadir, and said discharge means comprising a screw conveyor disposed in said settling tank adjacent the nadir of its base.

4. An apparatus for removing contaminating solids from the effluent discharged by paper producing machines, comprising:

centrifugal filter means for filtering a substantial quantity of clarified liquid from the effluent;

first conduit means adapted to be connected to said centrifugal filter means for carrying effluent therefrom;

centrifugal screening means for dividing the larger solid contaminants in the effluent from the remainder of the effluent, said centrifugal screening means being connected to said first conduit means to receive effluent from the latter;

second conduit means connected to said centrifugal screening means for carrying therefrom said remainder of the effluent;

cyclonic separating means for separating said remainder into a first portion substantially freed from contaminating solids and a second portion carrying contaminating solids, said cyclonic separating means being connected to said second conduit means to receive said remainder therefrom;

third conduit means connected to said cyclonic separating means for discharging from the apparatus said first portion of said remainder;

a settling tank arranged to receive said second portion from said cyclonic separating means for containing said second portion to allow the lighter contaminating solids therein to collect adjacent the upper level of said settling tank while the heavier contaminating solids therein collect adjacent the lower level of said settling tank;

first discharge means for discharging said lighter contaminating solids from adjacent the upper end of said settling tank;

second discharge means for discharging said heavier contaminating soilds from adjacent the lower end of settling tank; and an outlet conduit communicating with said settling tank intermediate the upper and lower ends thereof for discharging clarified effluent from said settling tank;

said outlet conduit being connected to said second conduit means for supplying clarified effluent thereto such that the latter flows into said cyclonic separating means and is discharged from the apparatus through said third conduit means.

5. A method for removing contaminating solids from the effluent discharged by paper producing machines, comprising:

screening the effluent by a screening apparatus to divide the larger contaminating solids in the effluent from the remainder of the effluent and separately discharging said larger contaminating solids and said remainder from the screening apparatus;

separating said remainder of the effluent by a cyclonic separator into a first portion substantially freed from contaminating solids and a second portion containing contaminating solids and separately discharging said first and second portions from the cyclonic separator;

introducing said second portion into a settling tank and allowing the lighter contaminating solids in said second portion to collect adjacent the upper level of said second portion while the heavier contaminating solids in the second portion collect adjacent the lower level thereof;

separately discharging said lighter contaminating solids, said heavier contaminating solids, and the clarified effluent from the settling tank; and returning the clarified effluent to said cyclonic separator for discharge with said first portion.

6. The method according to claim 5, further comprising:

treating said second portion with a sewage treatment chemical immediately prior to its introduction into said settling tank.

7. A method for removing contaminating solids from the effluent discharged by paper producing machines, comprising:

filtering the effluent in a centrifugal filtering apparatus to filter a substantial quantity of clarified liquid from the effluent;

screening the effluent by a screening apparatus to divide the larger contaminating solids in the effluent from the remainder of the effluent and separately discharging said larger contaminating solids and said remainder from the screening apparatus;

separating said remainder of the effluent by a cyclonic separator into a first portion substantially freed from contaminating solids and a second portion containing contaminating solids and separately discharging said first and second portions from the cyclonic separator;

introducing said second portion into a settling tank and allowing the lighter contaminating solids in said second portion to collect adjacent the upper level of said second portion while the heavier contaminating solids in the second portion collect adjacent the lower level thereof; and separately discharging said lighter contaminating solids, said heavier contaminating solids, and the clarified effluent from the settling tank.

8. A method for removing contaminating solids from the effluent discharged by paper producing machines, comprising:

screening the effluent by a centrifugal drainer to divide the larger contaminating solids in the effluent from the remainder of the effluent and separately discharging said larger contaminating solids and said remainder from the screening apparatus;

separating said remainder of the effluent by a cyclonic separator into a first portion substantially freed from contaminating solids and a second portion containing contaminating solids and separately discharging said first and second portions from the cyclonic separator;

introducing said second portion into a settling tank and allowing the lighter contaminating solids in said second portion to collect adjacent the upper level of said second portion while the heavier contaminating solids in the second portion collect adjacent the lower level thereof;

separately discharging said lighter contaminating solids, said heavier contaminating solids, and the clarified effluent from the settling tank; and returning the clarified effluent discharged from said settling tank to said cyclonic separator for discharge with said first portion.

References Cited

UNITED STATES PATENTS

| | | | |
|---|---|---|---|
| 1,624,385 | 4/1927 | Bergen | 210—295 |
| 1,873,598 | 8/1932 | Jones | 210—73 X |
| 2,592,983 | 4/1952 | Hildebrandt | 210—298 X |
| 2,648,433 | 8/1953 | Wright et al. | 210—512 X |
| 2,886,287 | 5/1959 | Croley | 210—195 X |
| 2,919,898 | 1/1960 | Marwil et al. | 210—195 X |
| 3,042,209 | 7/1962 | Czirfusz | 210—73 |
| 3,114,309 | 12/1963 | Haug | 210—403 X |
| 1,159,044 | 11/1915 | Kelly | 210—537 X |

REUBEN FRIEDMAN, *Primary Examiner.*

SAMIH N. ZAHARNA, *Examiner.*

J. ADEE, *Assistant Examiner.*